April 12, 1966 D. L. BALLARD 3,246,169

ELECTRONIC LOGICAL SUM, PRODUCT AND NEGATION DEVICE FOR SUPERIMPOSABLE CARD SYSTEM

Filed April 13, 1961 2 Sheets-Sheet 1

INVENTOR
Delbert L. Ballard

BY Homer R. Montague
atty.

April 12, 1966 D. L. BALLARD 3,246,169

ELECTRONIC LOGICAL SUM, PRODUCT AND NEGATION DEVICE FOR SUPERIMPOSABLE CARD SYSTEM

Filed April 13, 1961

2 Sheets-Sheet 2

INVENTOR

Delbert L. Ballard

BY Homer R. Montague

Atty.

United States Patent Office 3,246,169

Patented Apr. 12, 1966

3,246,169

ELECTRONIC LOGICAL SUM, PRODUCT AND NEGATION DEVICE FOR SUPERIMPOSABLE CARD SYSTEM

Delbert L. Ballard, Bethesda, Md., assignor to Jonker Business Machines, Inc., a corporation of Delaware Filed Apr. 13, 1961, Ser. No. 102,821
4 Claims. (Cl. 307—88.5)

This invention pertains to information retrieval systems based on the use of superimposable cards dedicated to terms and the determination of coincidence of holes in said cards. These systems are also known as Peekaboo systems. Commercially they are known as Termatrex systems.

In the Termatrex systems, an item of information is prepared for entry into the system by first indexing it by a number of terms taken from a vocabulary of terms. Each item of information is given an accession number.

Termatrex systems comprise a number of cards each dedicated to a term. In total there will generally be a vocabularly of between 500 and 5000 terms. On each termcard there generally is one place dedicated to a document in the collection. Each document has the same position dedicated to it on each termcard.

Items of information are entered into a Termatrex system by selecting all of the termcards by which that item has been indexed, placing these cards superimposition in a Termatrex machine and drilling a hole in all of these cards simultaneously at the position dedicated to that item of information.

The system is searched by selecting a number of termcards together describing a search question, and placing these in superimposition in a Termatrex machine. Next, a light in the bottom of the Termatrex machine is turned on. The coinciding holes in these termcards are then visible as light dots. The serial number of these light dots can then be read-off one by one, for example, by means of a transparent grid with an $x$–$y$ coordinate system on it. This search by coincidence of holes is called search by coincidence of terms.

However, sometimes search by logical sums as well as logical difference is required. The logical product of term A and B is all documents indexed by A as well as B. The logical sum is all documents indexed by terms A and all indexed by term B. The logical difference is all documents indexed by term A, but not by term B.

If besides logical products, sums and differences have to be made from the same termcards, this can be done electronically. To do this the cards will first have to be scanned individually, for example, by a flying spot scanner. This information can then be fed into an electronic sum, product and negation device. The latter device is the object of this invention.

The invention will now be described with reference to the following figures.

One intended mode of use of the invention is described below.

Figure 1:
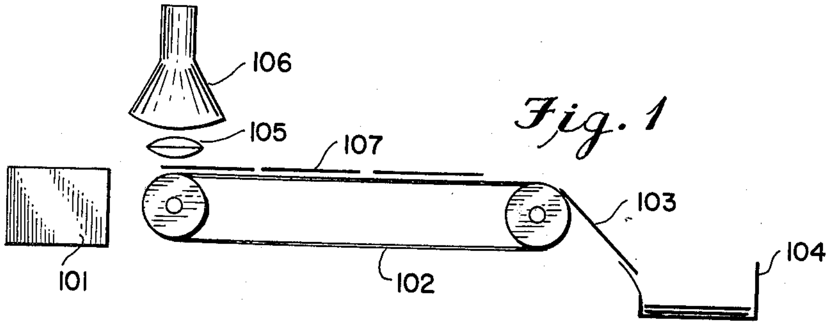
FIG. 1 shows a card scan comprising a conveyor and scanner of the flying spot type.

FIG. 1 shows a hopper 101 and an endless belt 102 on which the cards 107 are deposited. The cards 107 pass under a lens system 105 and a flying-spot type scanner 106, which scans the cards. After this they are deposited by a chute 103 in the bin 104.

It is also possible to use a miniaturized version of the Termatrex system described in co-pending patent applications, in which case the cards are all on a strip of film which is passed under the lens 105 and scanner 106.

In either case the scanner first has among all of the cards in the system that are being passed under it, to identify the correct ones and then scan the same.

Figure 2:
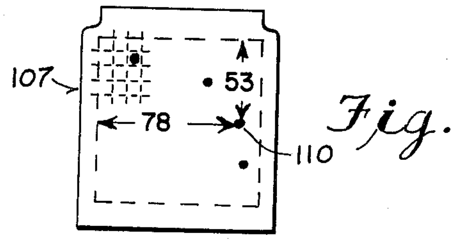
FIG. 2 shows an example of a termcard.

FIG. 2 shows an example of a termcard 107. The grid designates positions dedicated to the documents. A commonly used method of identifying is the use of $x$–$y$ coordinates. The entire card has 10,000 of these arrayed in a matrix of 100 x 100. Thus if the coordinates of position 110 are 53 and 78, the serial number of the document corresponding to that position is 5378.

The scanning device, such as, for example, the flying spot data reader 106 or some other suitable form of scanner may convert the presence or absence of a hole in a given location on the termcards into a corresponding one (1) or zero (0) binary digit within a series of such representations.

It will be understood that such a series of digital representations may also be derived from sources other than Termatrex cards or their images. Such series may be prepared, for example, by standard punched card techniques or by computers and may be entered into the device of this invention in any manner which permits formation of a series of binary representations of a yes or no nature spread out over a period of time. Such means would include punched cards, punched paper tape, magnetic tape, radio or wire transmissions, light pulses or similar devices and techniques.

To permit automatic selective recognition of different termcards, a fixed number of binary digits may be dedicated to the uniquely coded identification of each card or card image. These initial bits when recognized by the control unit determine whether this record is required for the problem at hand and if so, which of the five possible electronic gate functions must be performed.

Figure 3:
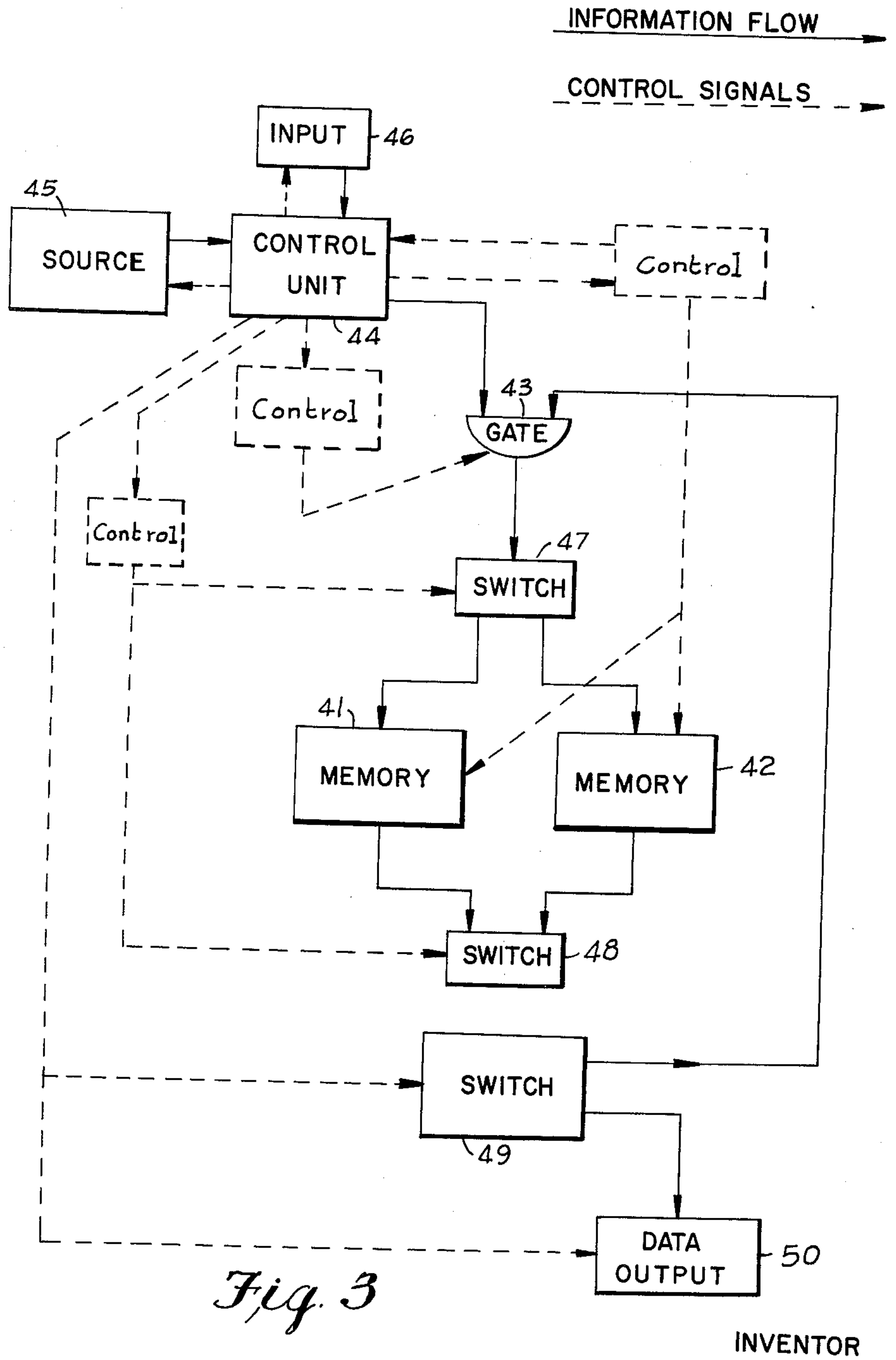
FIG. 3 shows a block diagram of the invention.

Referring to FIG. 3 the operation of the device will now be described. Initial reading of the first term causes the gate 43 to assume the OR function. Memories 41 and 42 are cleared to all zeros, then all incoming pulses after the code identification are stored one by one in successive locations in memory 41. Upon reading in the last position of the first term, a new term is fed into reading position by data input 46. The identification is checked by control unit 44. If it is not required another term is fed into reading position, and so on until the identification matches a required term. The gate function is set according to the requirement for that term by the control unit 44 and the pulses following the code identification are fed into the gate 43 simultaneously with reading out from memory 41 into the gate 43 those pulses previously stored in memory 41. The resultant gate output pulses are stored one by one in successive locations in memory 42.

With each succeeding term the read in and read out functions of memories 41 and 42 are reversed by switches 47 and 48 so that one reads in while the other reads out and vice versa.

The above mentioned memories may take the form of any serial memory device, numerous examples of which are well known in the computer art. For example, two similar magnetic drums with reading and writing heads, or two similar groups of coincident current magnetic core memory may be used. The address control techniques are well known in the computer art, as are the switching techniques used in changing the routing of the pulses from one portion of the device to another.

The control unit 44 receives its information from a keyboard, punched cards, punched paper tape, magnetic tape or any other suitable source 45 in the same sequence in which terms will be fed into the input device. Selection of the appropriate term then requires matching, by well known means, a series of binary digits representing the code for that particular term in the input against those digits temporarily stored by the function control unit. Until such a match occurs the input 46 will feed term after term, reading only the identification codes.

Upon obtaining a matching code the input unit 46 will read into the gate 43, as previously described, the entire series of item digits. The function of the gate 43 will be controlled at this point by the control unit 44 in accordance with one of five possible codes predetermined as being necessary to the solution of the problem at hand. In other words, the solution of any given problem will be determined in a manner analogous to the programming of a computer by selecting from the available data those terms desired and performing a predetermined series of logical operations thereon. Upon completion of the problem, switch 49 causes the pulse series to read out to the data output 50.

In the device of this invention input terms and previously stored logical combinations of terms are treated as two separate but chronologically synchronous series of binary pulses consisting of ones (1) representing holes and zeros (0) representing no hole in a card or card image.

If we let the letter A represent the ones input pulses and B represent the previously stored logical combinations ones pulses then the following outputs may be selectively obtained from the gate:

(1) Either A or B
(2) Both A and B
(3) A but not B
(4) B but not A
(5) *A but not B* or *B but not A*

One and only one of the control hubs will be energized at any one time and will be continuously energized during the logical processing of any desired term.

Figure 4:
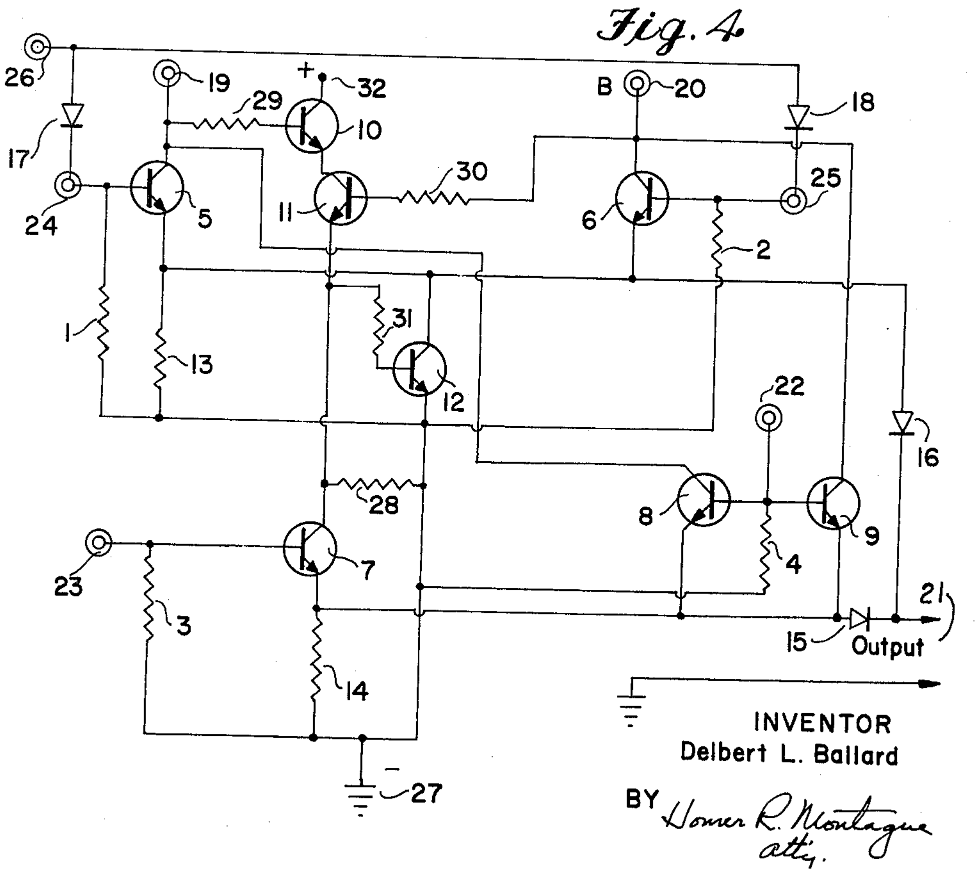
FIG. 4 shows a circuit of the gating unit.

In the embodiment illustrated in FIGURE 4 npn transistors are shown as the switching elements within the gating device and pulses of positive potential with respect to ground are considered to represent binary ones (1). The bias resistors 1, 2, 3 and 4 are connected to negative grounded terminal 27 of a suitable source, and in the absence of a positive energizing potential serve to keep the transistors 5, 6, 7, 8 and 9, to whose bases they are connnected, in the nonconducting state.

Input pulse series A and B enter the gate at points 19 and 20 respectively. A positive pulse arriving at input 19 will energize transistor 10 through resistor 29 causing it to become conductive and thereby place the collector of transistor 11 at a potential near that of the positive supply source terminal 32. A positive pulse arriving at input 19 will also raise the collector potentials of transistors 5 and 8 to substantially that of the pulse source.

Similarly a positive pulse arriving at input 20 will energize transistor 11 through resistor 30 causing it to become conductive. It also raises the collector potentials of transistors 6 and 9 to substantially that of the pulse source. If transistor 10 is not conducting the small base to emitter current from transistor 11 cannot overcome the bias voltage established by resistor 28, hence transistor 12 will remain nonconductive and not short to ground the potential developed at the emitter of transistor 6 if the control hub 25 were energized. On the other hand if transistor 10 is also conducting, the much higher current flowing through transistor 10, transistor 11 and resistor 28 will raise resistor 31 and the base of transistor 12 and effectively short to ground the positive voltage otherwise established across resistor 13 by the conduction of either transistor 5 or 6. From the foregoing description it will be seen that energization of hub 24 will give a positive output voltage across resistor 13 through diode 16 to output 21 if input 19 is energized but input 20 is not energized. Conversely, energization of hub 25 will provide a positive output across resistor 13 through diode 16 to output 21 if input 20 is energized but input 19 is not energized. Both hubs 24 and 25 may be energized simultaneously by energizing hub 26 to provide a positive output across resistor 13 through diode 16 to output 21 if either one, but only one, of the two inputs 19 and 20 receive a pulse. Diodes 17 and 18 serve to isolate hubs 24 and 25 when used independently.

A pulse to input 19 or 20 will place a positive potential across transistor 8 or 9 respectively. If hub 22 is energized at this time both transistors will be conductive and a positive potential will be developed across resistor 14 and appear through diode 15 at output 21. If both inputs 19 and 20 are simultaneously energized transistor 12 will be conductive but diode 16 will prevent the grounding out of the output at 21. Therefore, hub 22 when energized causes a positive output at 21 when either or both inputs 19 and 20 receive a pulse.

If hub 23 is energized transistor 7 is rendered conductive. Simultaneous inputs at 19 and 20 energize transistors 10 and 11 respectively, which in turn place the collector of transistor 7 at a high positive potential. The current flowing through the collector to emitter path of transistor 7 develops a positive potential at the junction of the emitter and the resistor 14 placing this potential through diode 15 upon output 21. Diode 16 prevents shorting the output 21 to ground by the action of conducting transistor 12.

It will be obvious to those versed in the art that pnp transistors may be substituted for the npn type illustrated provided that proper polarities are observed. In similar manner relays may be substituted as switching devices without departing from the spirit of the invention. A multiplicity of resistor and/or diode logic gates might also serve the same functions.

I claim:

1. A multi-function logical gating circuit for selectively performing different logical operations upon concurrent pairs of pulse signal trains, both consisting of successive binary digit potentials, comprising:

(a) first and second signal-train input terminals adapted to receive the respective concurrent binary potentials of said signal trains,
(b) a plurality of normally non-conducting switching elements each having a pair of main current path terminals and a conduction control terminal,
(c) a circuit connecting three of said elements with their current path terminals in series with one another and with a load resistor and a source of direct current,
(d) a signal output terminal connected between one terminal of said load resistor and one of said three elements,
(e) circuit means connecting said input terminals to the control terminals of the other two of said three elements,
(f) a further pair of said switching elements having their current path terminals connected respectively to said respective input terminals and through a first common isolating diode to said output terminal,
(g) still another pair of said switching elements having their current path terminals connected respectively to said respective input terminals and through a second common isolating diode to said output terminal,
(h) a final switching element having its current path terminals connected between the other terminal of said load resistor and the point of connection of the switching elements of one of said pairs to their common isolating diode,
(i) and means for selectively controlling the energization of said switching elements in accordance with selected logical operations upon the pulse signal trains applied to said input terminals.

2. A gating circuit in accordance with claim 1, in which the last-named means comprises bias control supply terminals connected respectively to:

(1) both the control terminals of one of said pairs of switching elements, (2) the respective control terminals of the other of said pairs of switching elements, and (3) the control terminal of said one of said three elements.

3. A gating circuit in accordance with claim 1, in which all of said switching elements are transistors.

4. A gating circuit in accordance with claim 2, in which the said last-named means additionally includes a bais control supply terminal connected through respective isolating diodes to the said respective control terminals of said other of said pairs of switching elements.

References Cited by the Examiner

UNITED STATES PATENTS

| | | | |
|---|---|---|---|
| 2,820,897 | 1/1958 | Dean et al. | 235—61 |
| 3,016,466 | 1/1962 | Richards | 235—61 |
| 3,020,525 | 2/1962 | Garrison et al. | 340—172.5 |
| 3,024,989 | 3/1962 | Papo et al. | 235—61.7 |
| 3,028,088 | 4/1962 | Dunham | 340—172.5 |

ARTHUR GAUSS, *Primary Examiner.*

WALTER W. BURNS, *Examiner.*